May 26, 1959 G. RALSTON ET AL 2,888,604
CIRCUIT FOR INCREASING THE USABLE LIGHT
OUTPUT OF CATHODE RAY TUBES
Filed Sept. 22, 1955 2 Sheets-Sheet 1

WITNESSES
Edwin E. Bassler
John J. Callahan

INVENTORS
George Ralston &
Kenneth E. Farr
BY F. E. Browder
ATTORNEY

May 26, 1959 G. RALSTON ET AL 2,888,604

CIRCUIT FOR INCREASING THE USABLE LIGHT OUTPUT OF CATHODE RAY TUBES

Filed Sept. 22, 1955 2 Sheets-Sheet 2

2,888,604

CIRCUIT FOR INCREASING THE USABLE LIGHT OUTPUT OF CATHODE RAY TUBES

George Ralston, Baltimore, Md., and Kenneth E. Farr, Rockefeller Township, Northumberland County, Pa., assignors to Westinghouse Electric Corporation, East Pittsburgh, Pa., a corporation of Pennsylvania Application September 22, 1955, Serial No. 535,970

12 Claims. (Cl. 315—14)

Our invention relates to circuit arrangement for cathode ray tubes, and in particular, relates to circuit arrangements for increasing the usable light output of cathode ray tubes utilized in television receiver apparatus.

One type of a cathode ray tube which is employed in color television receiver apparatus is named a masked-target color kinescope.

Masked-target color kinescopes are described in detail in United States Patents 2,595,548 and 2,630,542.

In kinescopes of the subject type, the electron-sensitive target comprises a multiplicity of groups of sub-elemental picture areas. The sub-elemental areas of which the groups are comprised are each coated with a different phosphor material. Each phosphor material, when struck by electrons, emits light of a color component (usually red, green or blue) individual to a given sub-elemental area. These phosphor areas may take the form of parallel lines or they may comprise a dot-like light pattern. The masking electrode or shadow mask, which is disposed adjacent to the sensitized face of the target, has the smallest possible thickness dimension. The reason for this is set forth in United States Patent 2,659,026.

Color kinescopes of the masked-target variety are limited to a predetermined power dissipation at the ultor (shadow mask and target). For example, one three gun shadow mask tube is limited to 15 watts of ultor dissipation. With a direct-current voltage of 20 kilovolts applied to the ultor, the ultor current will be 750 microamperes. The light output for this power is 38 foot-lamberts highlight brightness on an average scene. An all white scene will take three times the current as an average scene. The highlights will have the same brightness, but the threefold increase in average power will warp the shadow mask. Therefore, for safe operation of the kinescope for all scenes the power used by the picture tube is limited to about 5 watts for an average scene. The corresponding highlight brightness will be 13 foot-lamberts. Thus, for most scenes the tube delivers only one-third the light output that is possible.

Accordingly, it is an object of this invention to provide a circuit arrangement for increasing the usable light output of cathode ray tubes.

It is another object to provide a circuit arrangement for preventing the average anode current of a cathode ray tube from exceeding a predetermined value for an appreciable time.

It is another object to provide a circuit arrangement for preventing damage to the cathode ray tube caused by excessive current flow in the anode circuit.

It is still another object to provide a circuit arrangement for use in a television receiver apparatus for preventing the average anode current of a cathode-ray tube from exceeding a predetermined value for an appreciable time.

It is a still further object to provide a circuit arrangement for use in a television receiver apparatus for preventing damage to the cathode-ray tube caused by excessive current flow in the anode circuit.

The present invention, together with additional objects and advantages thereof, will best be understood from the following description, when read in connection with the accompanying drawings throughout which like reference characters indicate like parts, and in which.

Figure 1:
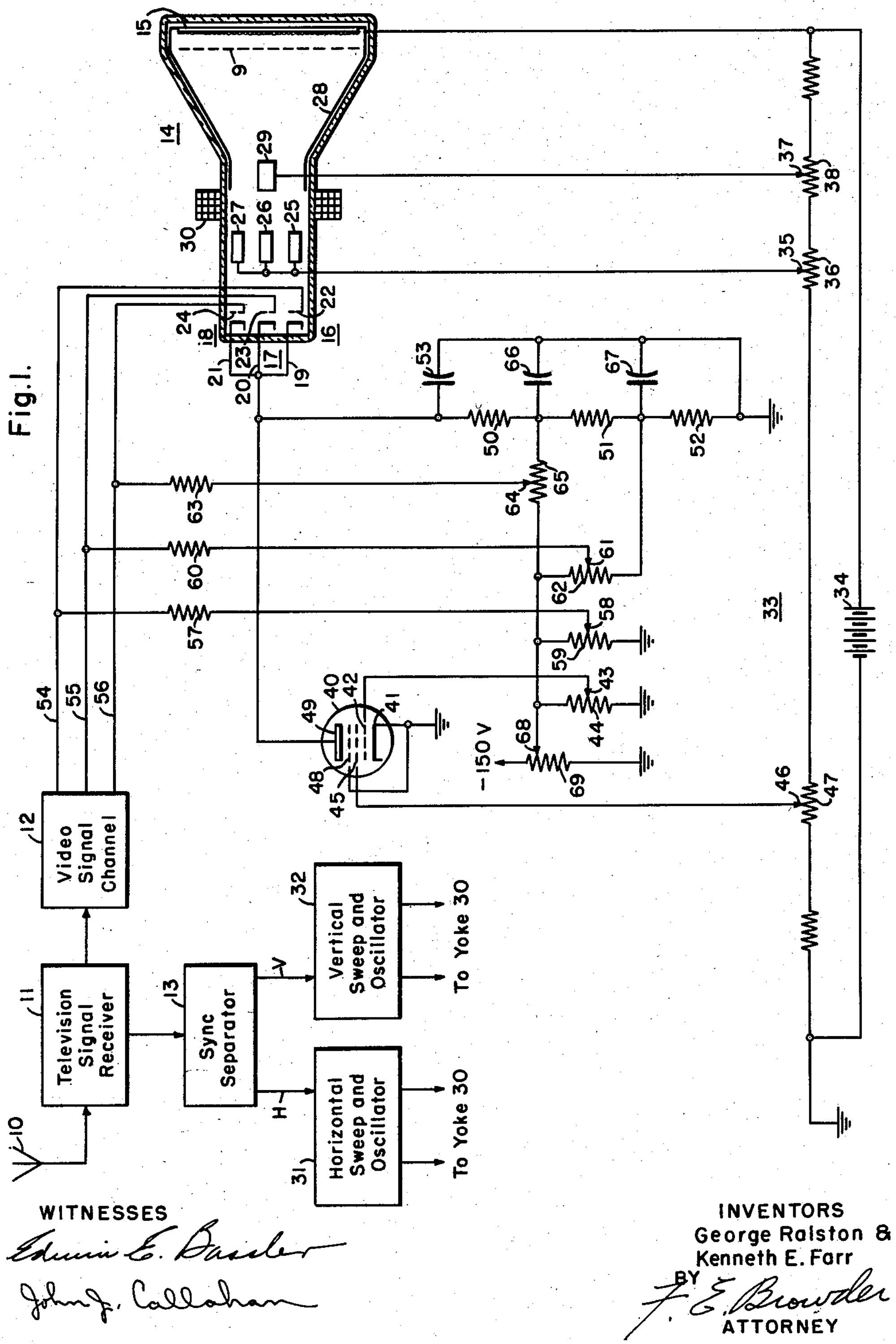
Figure 1 is a partial circuit diagram of a color television receiver showing one embodiment of the circuit arrangement of the present invention.

Referring to Figure 1 of the drawings, the television receiver represented in this drawing is generally conventional and includes an antenna 10 to which is coupled a conventional television signal receiver 11. The receiver 11 may include such apparatus as carrier wave amplifiers at both radio and intermediate frequencies, a frequency converter and a carrier wave demodulator or signal detector. Accordingly, there are derived from the receiver 11 the video and synchronizing signals. The video signals derived from the receiver 11 are impressed upon a video signal channel 12 and the synchronizing signals are impressed upon a sync separator 13. The video signal channel functions to convey color representative video signals to the usual electron beam control apparatus, referred to as electron gun apparatus, of an image reproducing device such as a kinescope 14, in a desired manner to produce a color image.

In the illustrative embodiments of the invention, it is assumed that the invention is used in a color television system and the kinescope may be of the same general type disclosed in U.S. Patents 2,595,548 and 2,630,542 heretofore referred to. It will be understood, however, that the kinescope alternately may be of other types of tubes of the masket-target variety such as described in an article entitled "A One-Gun Shadow-Mask Color Kinescope," by R. R. Law, published in the Proceedings of the IRE, volume 39, No. 10, October 1951, at page 1194. Also, it will be understood that the features of our invention may be applied to any cathode-ray tube where the maximum power dissipation or current is limited, and where the difference in the duty cycle of an average scene compared with an all-white field may be used to advantage as hereinafter set forth.

The kinescope 14 has a luminescent screen 15 which is provided with a multiplicity of small phosphor areas arranged in groups capable respectively of producing light of different primary colors in which the image is to be reproduced when excited by electron beam energy. In back of, and spaced from the screen 15, there is an apertured masking electrode 9, having an aperture for, and in alignment with, each group of phosphor areas of the screen 15. In the particular tube illustrated, the kinescope also comprises a plurality of conventional electron guns 16, 17 and 18 for developing electron beams comprising cathode electrodes 19, 20 and 21 and control electrodes 22, 23 and 24. The electron guns are equal in number to the number of primary colors in which the image is to be reproduced. Associated with the three electron guns are corresponding individual beam focusing electrodes 25, 26 and 27.

The color kinescope also includes a beam accelerating anode 28 generally in the form of a wall coating substantially as shown, and a beam convergence electrode 29.

The color kinescope also is provided with apparatus 30 by which to deflect a plurality of electron beams both vertically and horizontally to scan the usual raster at the luminescent screen 15.

The sync signal separator 13 produces both horizontal and vertical sync signals respectively in its output circuits H and V. The horizontal output circuit H is coupled to a horizontal sweep oscillator and output apparatus 31 which is coupled to the horizontal deflection winding of the yoke 30. The components of the apparatus 31 may be conventional. The vertical output circuit V is coupled to a vertical sweep oscillator and output apparatus 32 which is coupled to the vertical deflection winding of the yoke 30. The components of the apparatus 32 may also be conventional.

The potentials which are impressed on the various electrodes of the kinescope are derived by means of connections to a voltage divider resistor 33 connected across a source of unidirectional potential 34. The individual beam focusing electrodes 25, 26 and 27 are connected together to an adjustable tap 35 on resistor 36. The beam accelerating anode 28 is connected directly to the positive terminal of the potential source 34. The beam convergence electrode 29 is connected to an adjustable tap 37 on resistor 38. An electron discharge tube 40 is connected in the cathode circuit of the kinescope. In the circuit arrangement of Fig. 1, tube 40 is a pentode, but it may be almost any other type of grid control tube. Tube 40 comprises a cathode 41 which is connected to ground, a control grid 42 connected to the adjustable tap 43 on resistor 44 providing bias for grid 42, screen grid 45 energized from potential taken from the adjustable tap 46 on resistor 47, suppressor grid 48 connected to cathode 41, and an anode 49 connected to the cathode electrodes 19, 20 and 21 of the kinescope. The anode 49 is connected through resistors 50, 51 and 52 to ground potential. The anode 49 is also connected through the bypass capacitor 53 to ground potential.

The video signal channel 12 functions to convey over the leads 54, 55 and 56, red, green and blue video information to the control electrodes 22, 23 and 24, respectively, of the kinescope in order to intensity modulate the electron beams developed by the electron guns 16, 17 and 18. The lead 54 is connected through resistor 57 to the arm 58 of the red grid bias potentiometer 59. The lead 55 is connected through resistor 60 to the arm 61 of the green bias potentiometer 62 which in turn is connected to the junction of resistors 51 and 52. The lead 56 is connected through resistor 63 to the arm 64 of the blue bias potentiometer 65 which in turn is connected to the junction of resistors 50 and 51. A capacitor 66 is connected between the junction of resistors 50 and 51 and ground potential, and a capacitor 67 is connected between the junction of resistors 51 and 52 and ground potential. The resistors 44, 59, 62 and 65 are all connected to the arm 68 of the resistor 69 which in turn is connected to a suitable source of potential.

In operation, the source of unidirectional potential 34 is responsive to the intensity modulation of the electron beams and a fluctuating current flow is produced in the anode 28, that is, the anode current changes with changes in the level of the video information. The potentials on the electrodes of the tube 40 are adjusted so that the knee of the plate-current plate-voltage characteristic curve of the tube falls at a predetermined current value equal to a predetermined additive value of average current flow in the beam accelerating anode 28 and the focusing electrodes 25, 26 and 27. The anode current is averaged over a period of several fields by the capacitor 53. For a kinescope limited to 15 watts dissipation at the screen 15 and mask 9 and operated at 20 kilovolts, for example, this power means a current of 750 microamperes. The potentials on the electrodes of the tube 40 are thus set so that the maximum average current in the cathode circuit of the kinescope will equal 750 microamperes (maximum current in beam accelerating anode 28) plus 250 microamperes (maximum current in focusing electrodes 25, 26 and 27). If the tube 40 attempts to draw more current than one milliampere, the voltage drop across tube 40 will increase and as a result the bias on the kinescope will be increased. The increased bias on the kinescope operates to control the intensities of the electron beams to prevent average current flow in the anode 28 from exceeding a predetermined maximum value as determined by the potentials set on tube 40. High frequency changes in brightness will be bypassed around the tube 40 by means of capacitor 53.

In order to preserve black and white balance with varying currents in tube 40, the grid return leads are connected to a proper tap on the anode voltage of the tube 40. These taps are in the same ratio as the ratio of the video drive for the red, green and blue video information.

Figure 2:
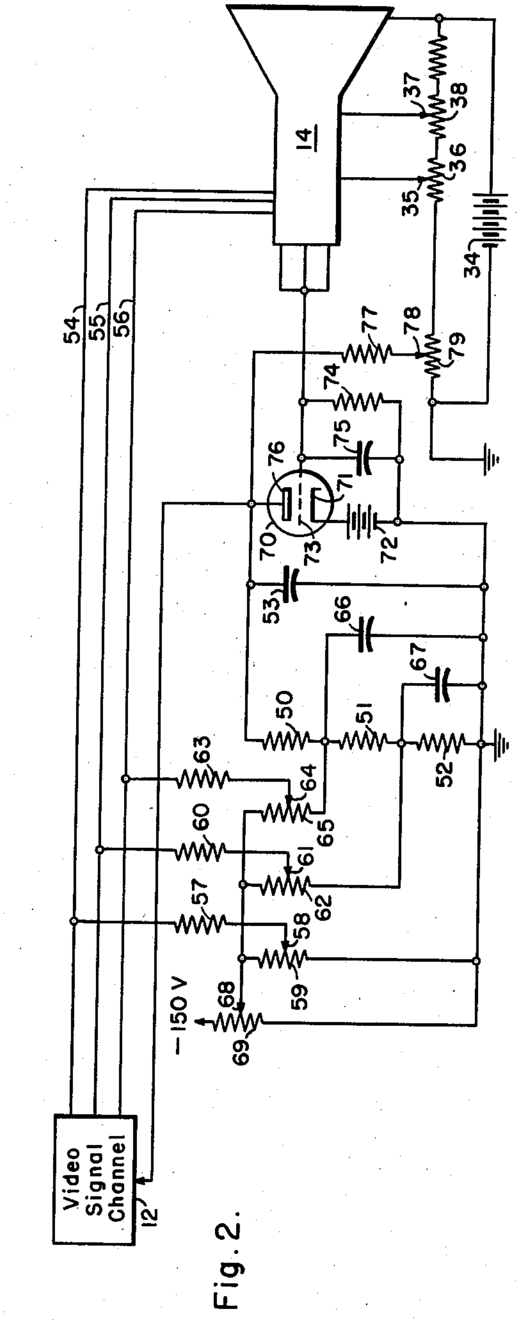
Fig. 2 is a partial circuit diagram showing another embodiment of the invention.

Referring to Figure 2, an electron discharge tube 70 is connected in the cathode circuit of the kinescope. Tube 70 comprises a cathode 71 which is connected to the positive terminal of a source of unidirectional potential 72, the negative terminal of which is at ground potential, a control grid 73 connected to the cathode electrodes of the kinescope 14 and through a network comprising resistor 74 and capacitor 75 to ground potential, and an anode 76 connected through resistor 77 to the adjustable tap 78 on resistor 79. The anode 76 is also connected to the video signal channel 12 and through the individual brightness control tracking circuits, as detailed in the description relating to Fig. 1, to the leads 54, 55 and 56.

This embodiment of the invention is a servo mechanism type control and in operation the arrangement compares the average current value in the accelerating anode 28 with a reference maximum allowed current. The video gain in the video signal channel 12, the bias on the kinescope 14, or both, may be varied so that the difference between the average current value in the anode 28 and the maximum allowed current is small. Short time variations of current in the anode 28 are bypassed by capacitor 75. The tube 70 is biased to cut-off until the voltage drop across the resistor 74 exceeds a predetermined value. When this occurs, tube 70 will conduct producing a change in voltage in the anode circuit of tube 70. This change in voltage will be proportional to the amount the current in the accelerating anode 28 attempts to exceed a maximum predetermined value. As a result this voltage change will operate to vary both the video gain in the video signal channel 12 and the bias on the kinescope 14. A variation of either the video gain or the bias on the kinescope 14 will effect the intensity of the electron beams. Hence, the average current flow in the anode 28 will be prevented from exceeding a predetermined maximum value as determined by the reference maximum allowed current.

Figure 3:
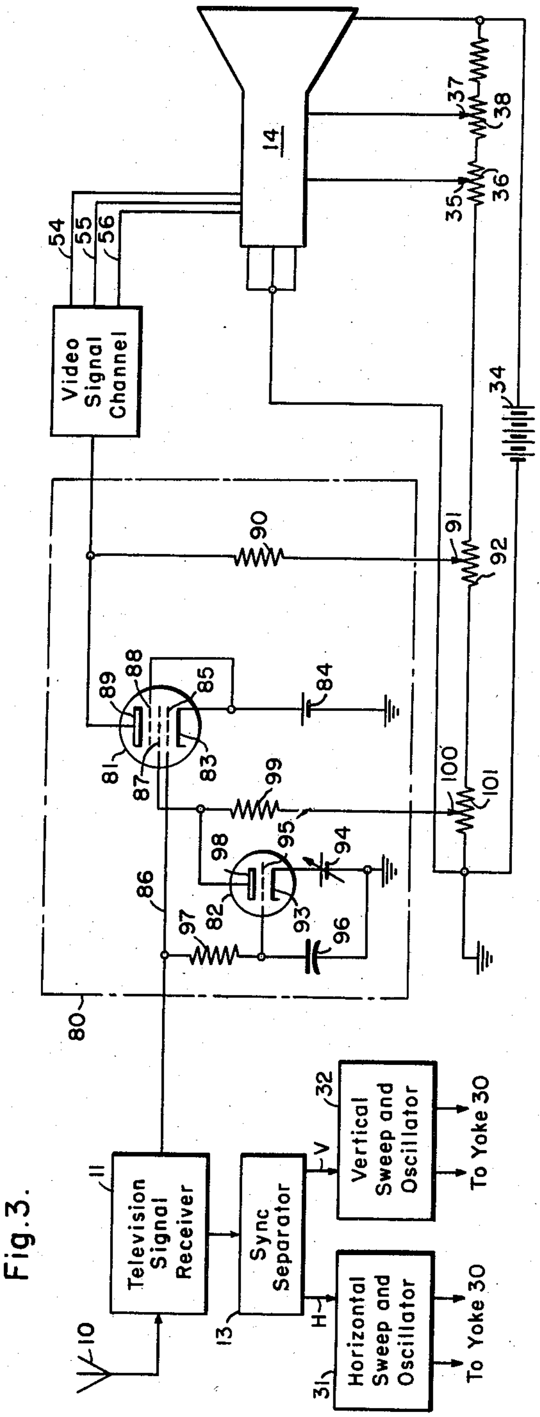
Fig. 3 is a partial circuit diagram showing another embodiment of the present invention.

Referring to Fig. 3, the video signals derived from the receiver 11 are supplied to the video signal channel 12 and thence are impressed upon the control electrodes of the kinescope 14. The video signal channel 12 comprises a gain control stage or unit 80. The gain control stage 80 comprises electron discharge tubes 81 and 82. Tube 81 is a variable gain tube in the video amplifier chain which may consist of a plurality of electron discharge devices for amplifying the video signals derived from receiver 11. As illustrated in the drawing, tube 81 is a pentode and comprises: a cathode 83 which is connected to the positive terminal of a source of unidirectional potential 84, the negative terminal of which is at ground potential; a control grid 85 connected to the receiver 11 by means of lead 86; a screen grid 87; a suppressor grid 88 connected to the cathode 83; and an anode 89 connected through the video signal channel 12 to the leads 54, 55 and 56 and also connected through resistor 90 to the adjustable tap 91 on resistor 92. Tube 82 comprises: a cathode 93 which is connected to the positive terminal of a variable source of unidirectional potential 94, the negative terminal of which is at ground potential; a control grid 95 connected through capacitor 96 to ground potential and also connected through resistor 97 to lead 86; and an anode 98 connected to screen grid 87 of tube 81 and also through resistor 99 to the adjustable tap 100 on resistor 101.

In operation, the control circuit of variable gain tube 81 is adjusted so that for video signals conveying picture information with a normal amount of white area there is no change in the video gain. The tube 82 is normally biased to cut-off, and anode voltage is applied to the screen grid 87 of tube 81. The direct-current component of the composite video signal from receiver 11 is applied to the control grid 95 through the filters 96 and 97. This component will have a negative polarity with respect to ground. For video signals conveying picture information with a substantial amount of white or high luminosity areas, a decrease in the negative direct-current voltage between the grid and cathode of tube 82 will cause tube 82 to conduct which will reduce its anode voltage. This reduction in the anode voltage of tube 82 will decrease the screen voltage of the variable gain tube 81 which, in turn, will lower the video gain of this tube. The lowering of the video gain of tube 81 will control the intensity of the electron beams of kinescope 14 and thus the average anode current of the kinescope will be prevented from exceeding a predetermined maximum value. The embodiment of Fig. 3 in effect monitors the video information for its average value.

The circuit can also be arranged to vary the control grid bias or the suppressor voltage of the tube 81 without departing from the teaching of this invention.

While we have shown our invention in preferred forms it will be obvious to those skilled in the art that it is not so limited but is susceptible of various changes and modifications without departing from the spirit thereof.

We claim as our invention:

1. A circuit arrangement comprises a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, and means for controlling the intensity of said electron beam so as to prevent average current flow in said anode electrode from exceeding a predetermined maximum value.

2. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, said current flow being directly proportional to changes in the intensity of said electron beam, and means for controlling the intensity of said electron beam so as to prevent average current flow in said anode electrode from exceeding a predetermined maximum value.

3. A circuit arrangement comprising a cathode-ray tube having at least an anode electrode and electron gun means developing an electron beam, a source of direct current potential, means for applying said direct current potential to said anode electrode, means for applying a video signal to said electron gun to intensity modulate said electron beam, said source of potential being responsive to modulation of said electron beam to produce a fluctuating current flow in said anode electrode, means connected to said electron gun means for varying the bias on said cathode-ray tube in response to a predetermined value of average current flow in said anode electrode so as to prevent average current flow in said anode electrode from exceeding a predetermined maximum value.

4. The circuit arrangement as defined in claim 3 wherein said last-mentioned means includes an electron discharge device having at least an anode electrode, a cathode electrode and a control grid, and includes means for supplying fixed operating potentials to the electrodes of said electron tube.

5. A circuit arrangement comprising a cathode-ray tube having at least an anode electrode, a focus element and electron gun means developing an electron beam, a source of direct current potential, means for applying said direct current potential to said anode electrode and means for applying a video signal to said electron gun means to intensity modulate said electron beam, said source of potential being responsive to modulation of said electron beam to produce a fluctuating current flow in said anode electrode and said focus element, means connected to said electron gun means for varying the bias on said cathode-ray tube in response to a predetermined additive value of average current flow in said anode electrode and said focus element to thereby prevent average current flow in said anode electrode from exceeding a predetermined maximum value.

6. The circuit arrangement as defined in claim 5 wherein said last-mentioned means includes an electron discharge device having at least an anode electrode, a cathode electrode and a control grid, and includes means for supplying fixed operating potentials to the electrodes of said electron tube, said electron tube having a plate-current plate-voltage characteristic curve having a knee in said curve located at a predetermined current value equal to said predetermined additive value of average current in said anode electrode and said focus element.

7. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, means connected to said electron gun means for comparing the average value of current in said anode electrode with a reference value of current, and means to control the intensity of said electron beam so as to prevent average current in said anode electrode from exceeding a predetermined maximum value.

8. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, means connected to said electron gun means for comparing the average value of current in said anode electrode with a reference value of current, said last-mentioned means including circuit means to vary the biasing of said cathode-ray tube and to effect gain control in said receiver so as to prevent average current in said anode electrode from exceeding a predetermined maximum value.

9. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, means connected to said electron gun means for comparing the average value of current in said anode electrode with a reference value of current, and means to vary the biasing of said cathode-ray tube so as to prevent average current in said anode electrode from exceeding a predetermined maximum value.

10. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said source of potential being responsive to modulation of said electron beam to produce a fluctuating current flow in said anode electrode, means connected to said electron gun means for comparing the average value of current in said anode electrode with a reference value of current, and means to effect gain control in said receiver so as to prevent average current in said anode electrode from exceeding a predetermined maximum value.

11. A circuit arrangement comprising a cathode-ray tube having at least an anode electrode and electron gun means developing an electron beam, a source of direct current potential, means for applying said direct current potential to said anode electrode, means for applying a video signal to said electron gun means to intensity modulate said electron beam, said means including an amplifier for amplifying said signals, said source of potential being responsive to modulation of said electron beam to produce a fluctuating current flow in said anode electrode, means connected to said last-mentioned means and being responsive to the direct current component of said video signal above a predetermined maximum intensity, said means being operable to vary the bias of said amplifier to effect gain control in said receiver to thereby prevent average current flow in said anode electrode from exceeding a predetermined maximum value.

12. A circuit arrangement comprising a cathode-ray tube having at least an anode electrode and electron gun means developing an electron beam, a source of direct current potential, means for applying said direct current potential to said anode electrode means for applying a video signal to said electron gun means to intensity modulate said electron beam, said means comprising a variable gain amplifier for amplifying said video signal, said source of potential being responsive to modulation of said electron beam to produce a fluctuating current flow in said anode electrode, an electron tube having at least an anode, a cathode and a control grid, a first circuit connecting the control grid of said electron tube to said last-mentioned means, and a second circuit connecting the anode of said electron tube to said amplifier, said first circuit comprising means for biasing said electron tube to oppose conduction therein in the absence of signals having a direct current component above a predetermined maximum intensity, said electron tube being operable to vary the gain of said amplifier in response to said direct current component above said predetermined maximum intensity to thereby prevent average current in said anode electrode from exceeding a predetermined maximum value.

References Cited in the file of this patent

UNITED STATES PATENTS

| | | |
|---|---|---|
| 2,122,990 | Poch | July 5, 1938 |
| 2,253,312 | Wilson | Aug. 19, 1941 |
| 2,255,485 | Dome | Sept. 9, 1941 |
| 2,459,319 | Hansell | Jan. 18, 1949 |
| 2,782,340 | Siskel | Feb. 19, 1957 |